United States Patent
Bigolin et al.

(10) Patent No.: US 12,337,921 B2
(45) Date of Patent: Jun. 24, 2025

(54) MODULAR BAG FOR BICYCLES AND THE LIKE

(71) Applicant: Brooks England Limited, West Midlands (GB)

(72) Inventors: Barbara Bigolin, Vicenza (IT); Ugo Villa, Vicenza (IT)

(73) Assignee: BROOKS ENGLAND LIMITED, West Midlands (GB)

( * ) Notice: Subject to any disclaimer, the term of this patent is extended or adjusted under 35 U.S.C. 154(b) by 615 days.

(21) Appl. No.: 17/610,073

(22) PCT Filed: Apr. 6, 2020

(86) PCT No.: PCT/IB2020/053258
§ 371 (c)(1),
(2) Date: Nov. 9, 2021

(87) PCT Pub. No.: WO2020/225617
PCT Pub. Date: Nov. 12, 2020

(65) Prior Publication Data
US 2022/0234669 A1    Jul. 28, 2022

(30) Foreign Application Priority Data
May 9, 2019    (IT) ......................... 102019000006695

(51) Int. Cl.
*B62J 9/26*     (2020.01)
*B62J 9/21*     (2020.01)
(Continued)

(52) U.S. Cl.
CPC . *B62J 9/26* (2020.02); *B62J 9/21* (2020.02); *B62J 9/23* (2020.02); *B62J 9/27* (2020.02)

(58) Field of Classification Search
CPC ....... B62J 11/04; B62J 9/21; B62J 9/23; B62J 9/26; B62J 9/27; B65D 21/086
(Continued)

(56) References Cited

U.S. PATENT DOCUMENTS 4,442,960 A * 4/1984 Vetter ......................... B62J 9/23
383/14
5,913,466 A * 6/1999 Revels ..................... B62J 11/00
224/463
(Continued)

FOREIGN PATENT DOCUMENTS

CN       201737084 U * 2/2011
DE       202007011990 U1   10/2007
(Continued)

OTHER PUBLICATIONS

CN-201737084-U Translation, Chen Y, Feb. 9, 2011 (Year: 2011).*
(Continued)

*Primary Examiner* — Nathan J Newhouse
*Assistant Examiner* — Matthew T Theis
(74) *Attorney, Agent, or Firm* — Tutunjian & Bitetto, P.C.

(57) ABSTRACT

Bag for bicycles and similar vehicles, adapted during use to be removably constrained to at least one bar of a frame of the bicycle or of the similar vehicle and/or of a rear rack and/or of a front rack, wherein the bag includes a first component, wherein the first component includes a support container provided with an opening, wherein the first component has at least one removable connection means including at least one band provided with at least one strap and/or hook and loop closure element, for removably constraining during use the first component to the at least one bar of the frame and/or of the rear rack and/or of the front rack of the bicycle or of the similar vehicle; method for removably connecting a bag for bicycles and similar vehicles.

20 Claims, 4 Drawing Sheets

(51) Int. Cl.
*B62J 9/23* (2020.01)
*B62J 9/27* (2020.01)

(58) Field of Classification Search
USPC .......................................... 224/420
See application file for complete search history.

(56) References Cited

U.S. PATENT DOCUMENTS

| | | | |
|---|---|---|---|
| 2007/0095872 A1* | 5/2007 | White | B62J 9/21 224/420 |
| 2010/0147918 A1 | 6/2010 | Hensley et al. | |
| 2012/0187170 A1* | 7/2012 | Ho | B62J 9/27 224/441 |

FOREIGN PATENT DOCUMENTS

| | | | |
|---|---|---|---|
| JP | 5277376 B1 | | 8/2013 |
| JP | 2014097674 A | * | 5/2014 |
| WO | 2005005235 A2 | | 1/2005 |

OTHER PUBLICATIONS

JP-2014097674-A Translation, Okubo T, May 29, 2014 (Year: 2014).*
International Search Report for PCT/IB2020/053258 dated Jul. 3, 2020 (3 pages).

* cited by examiner

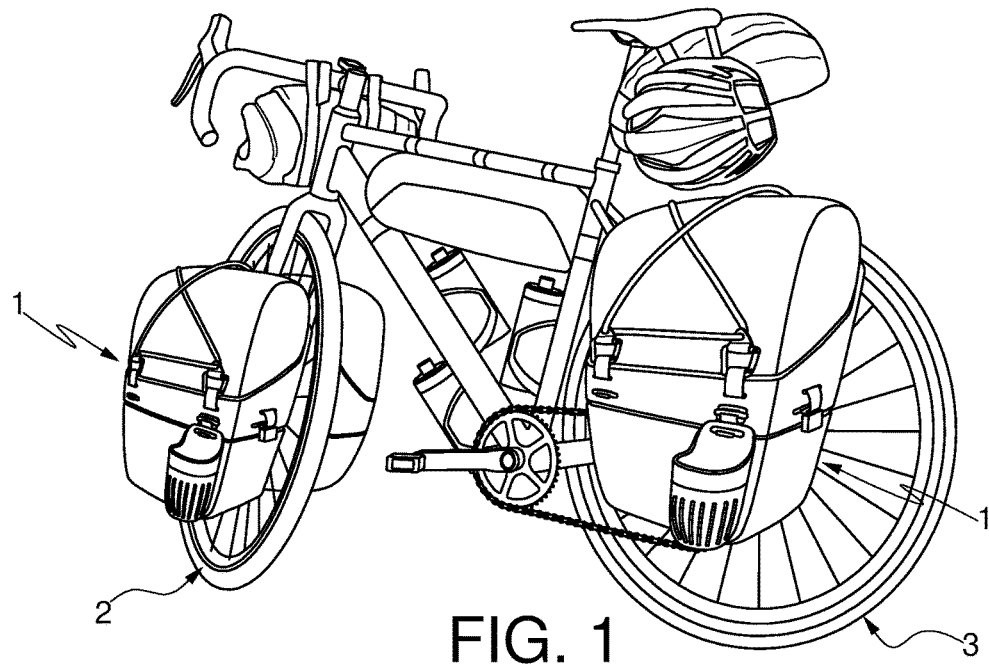
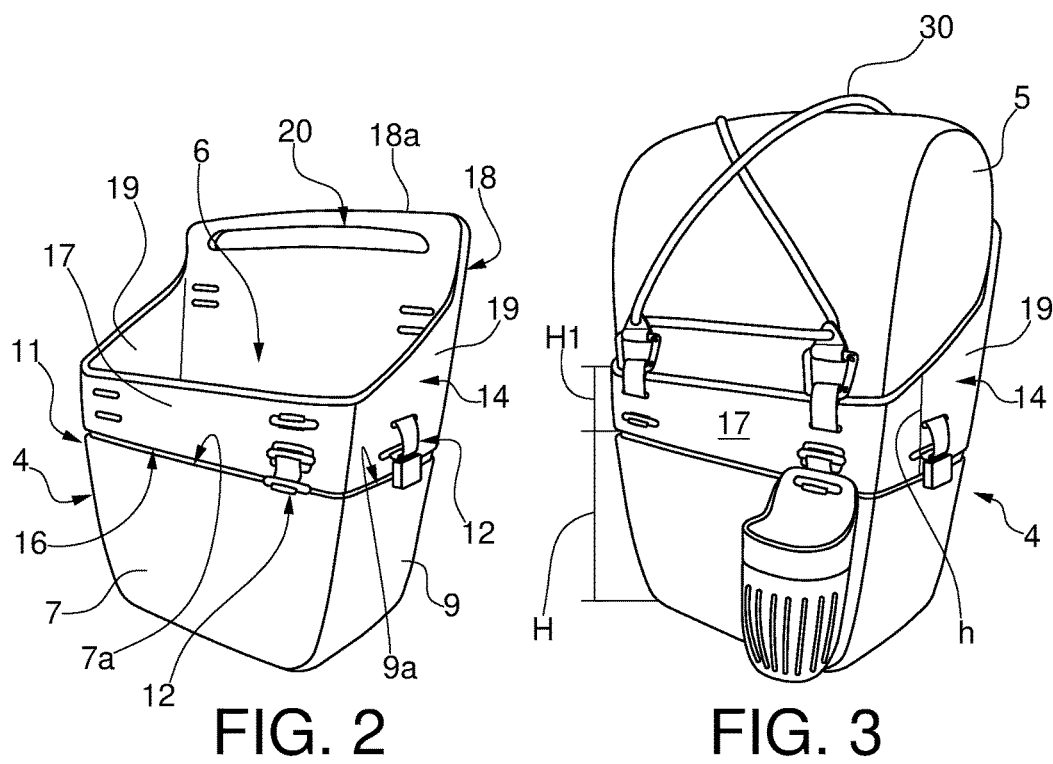
FIG. 1
FIG. 2
FIG. 3

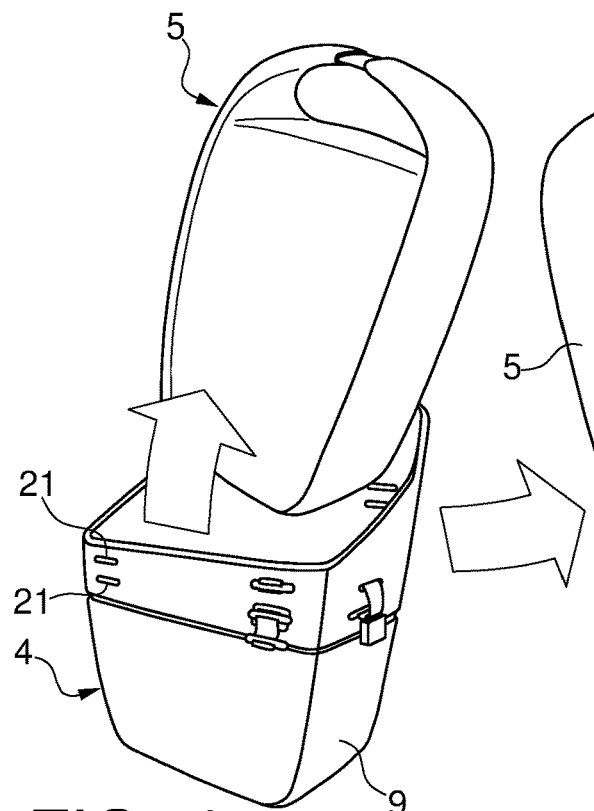
FIG. 4
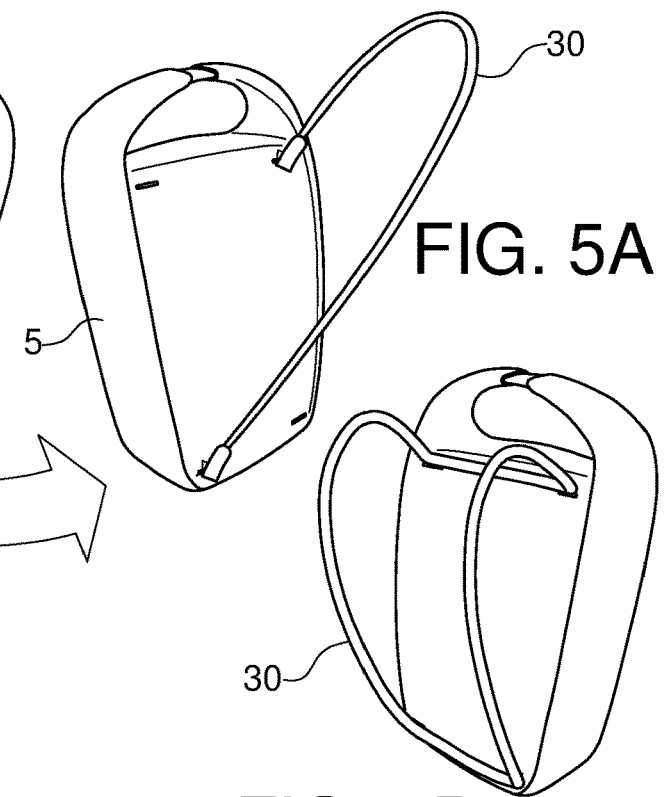
FIG. 5A
FIG. 5B
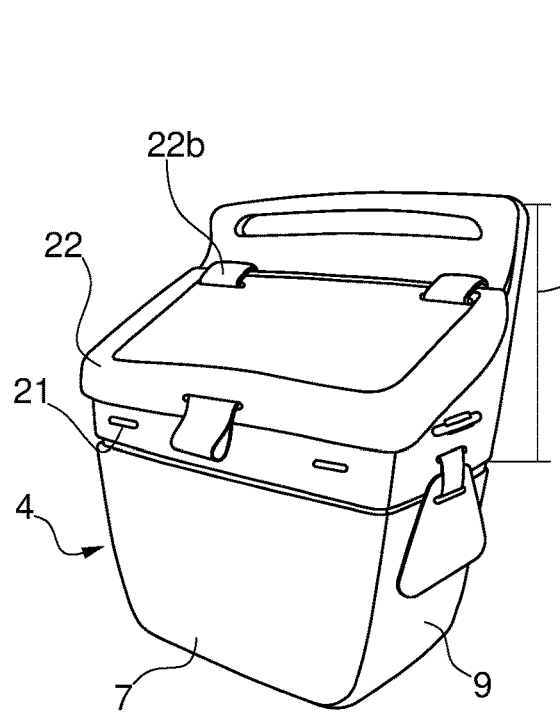
FIG. 6
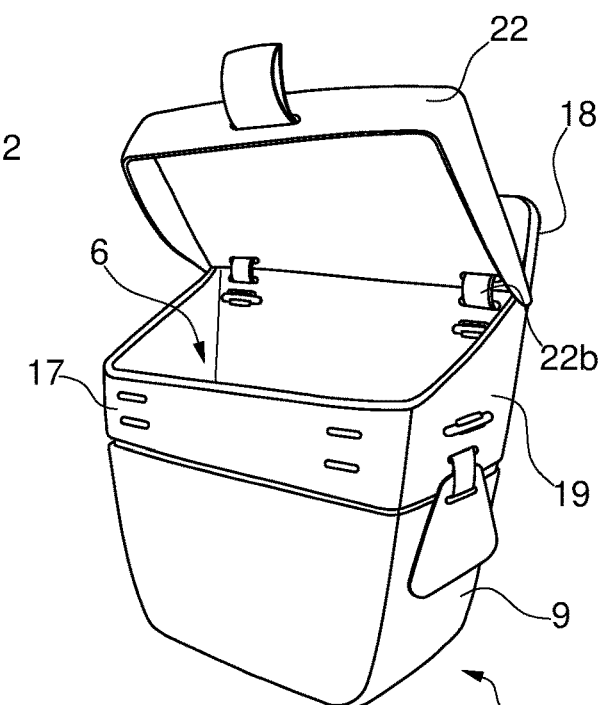
FIG. 7

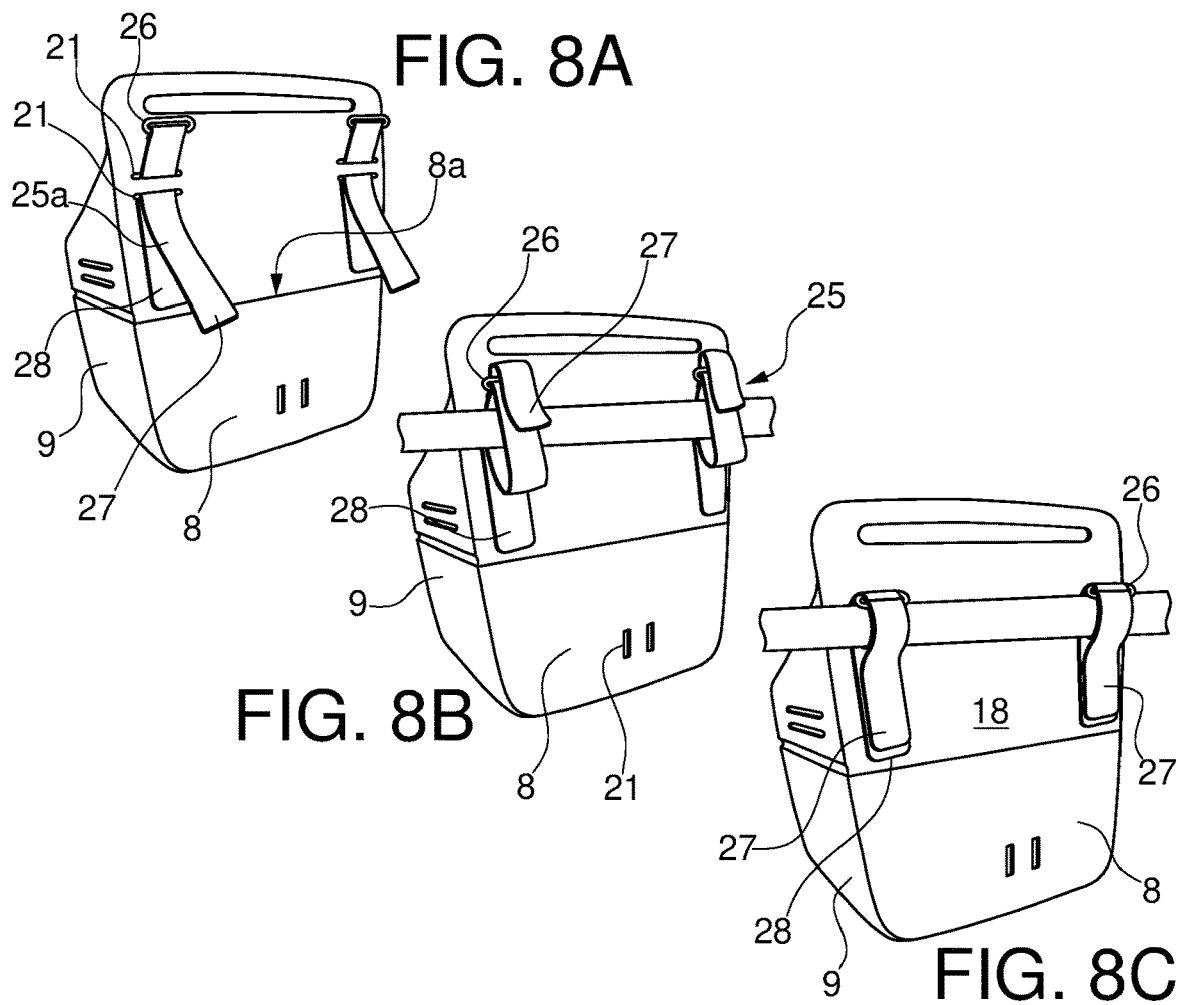
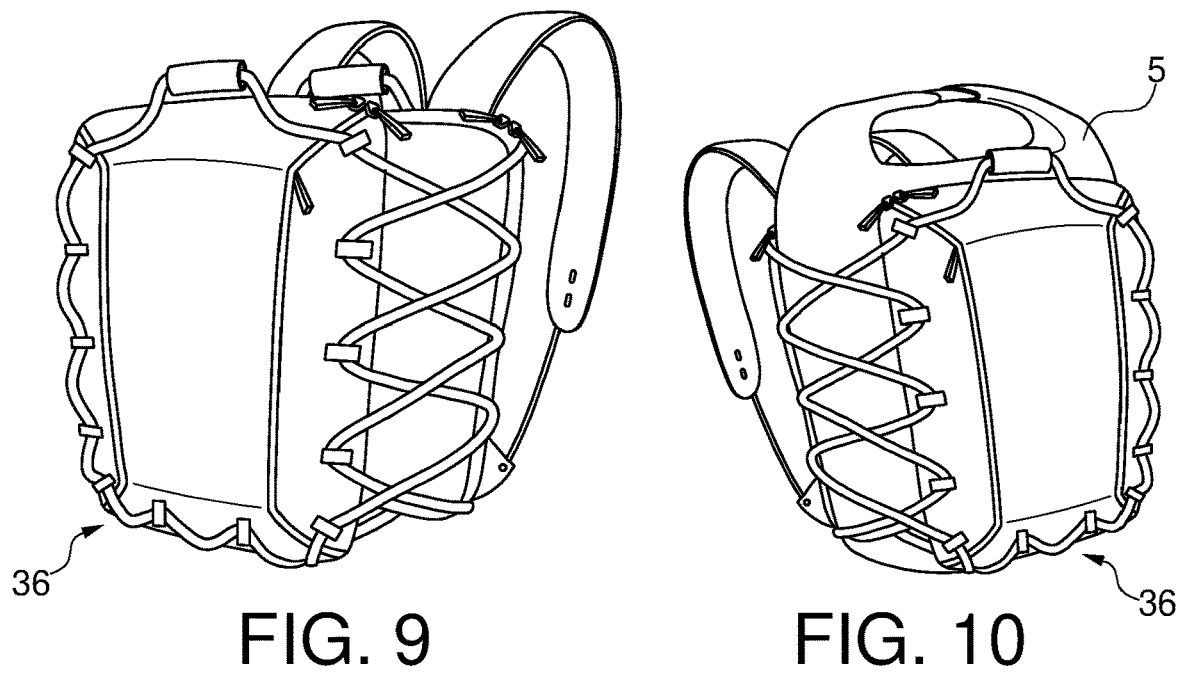

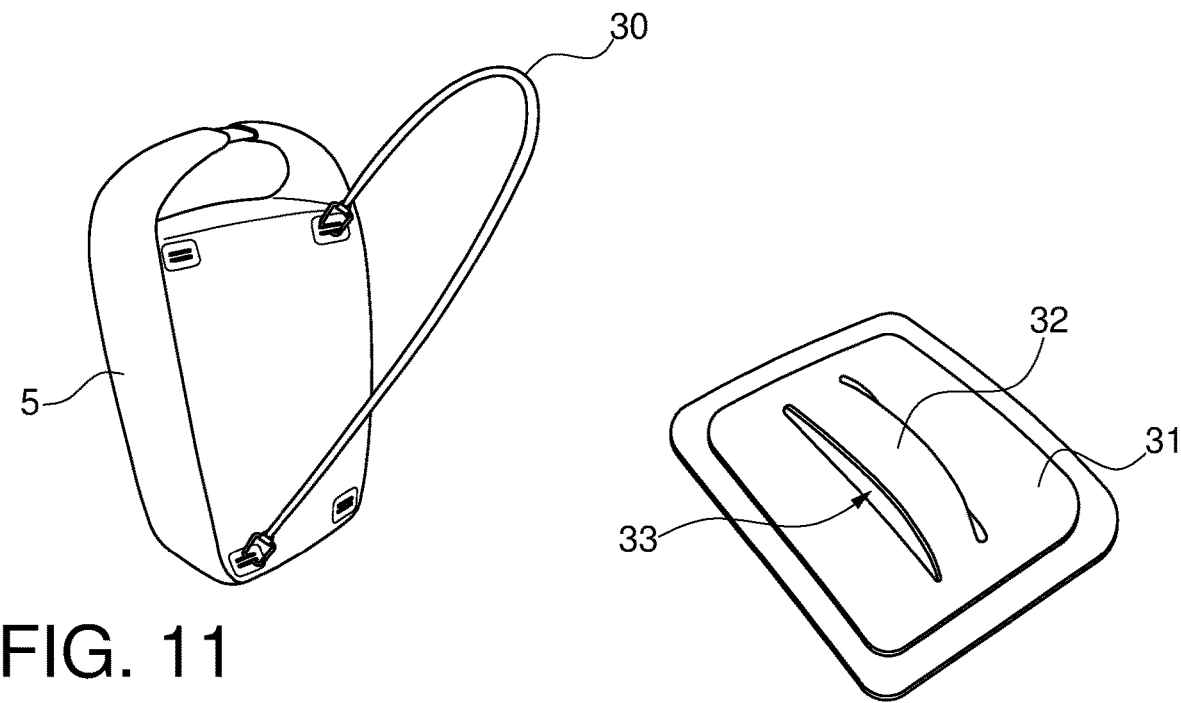
FIG. 11
FIG. 12
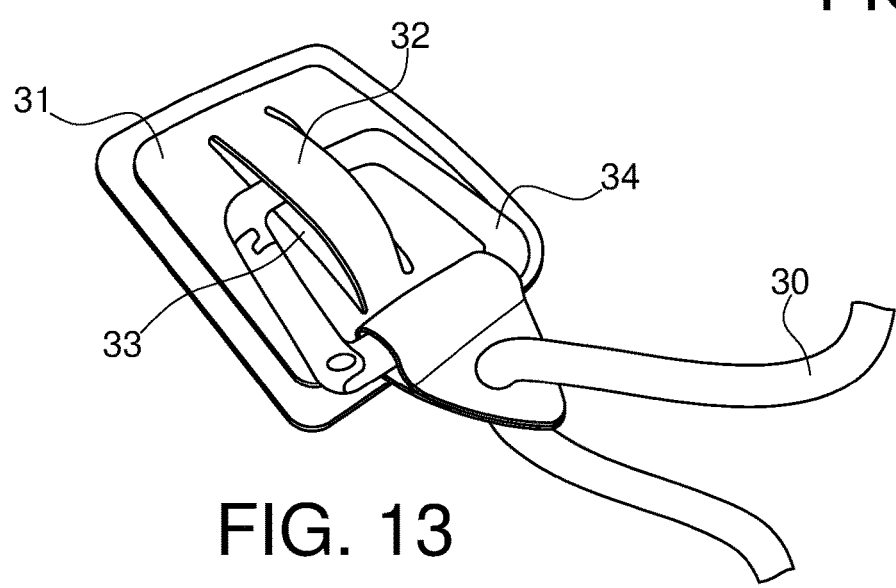
FIG. 13

MODULAR BAG FOR BICYCLES AND THE LIKE

TECHNICAL FIELD OF THE INVENTION

The present invention regards a modular bag for bicycles and similar vehicles.

More particularly, the present invention regards a modular bag for bicycles, adapted to removably house at its interior a further bag or second component.

STATE OF THE PRIOR ART

Bicycles or similar vehicles can be provided with bags, e.g. lateral, which are fixed to the frame of the bicycle, especially to the rear rack and/or to the front rack.

The lateral bags are connected to the tube of the rack and have, for such purpose, at least one pair of upper clasps, such as mechanical clip systems, which support the entire weight of the bag itself, and possibly also a lower pin, which is coupled to a vertical bracket of the frame, at the wheel of the bicycle. The lower pin allows maintaining the bag in position, without moving it during use.

Known bicycle bags mainly have the following drawbacks: The mechanical clip system is rather complex and subjected to breakage, e.g. caused by the vibrations generated during pedaling. Since such clasps must support the entire weight of the bags, they cannot be subjected to breakage. Simultaneously, since they must be removable, it is necessary to find the right compromise between strength and ease of mounting/dismounting by the user. In addition, when the bag is removed from the bicycle, and hence moved by the user, the relative attachment is exposed to further breakage risks.

Another disadvantage of the bicycle bags of known type is that, during use, they are subjected to getting very dirty, due to the mud or dust with which they come into contact during use. This is a significant drawback, when the cyclist reaches destination and must remove the bag from the frame of the bicycle, so as to bring it with him/her into the desired location (whether into home or for example in the tent in the case of camping).

Other disadvantages tied to the bags of conventional type are: often they result bulky and their mechanical attachment for the bicycle often adds weight to the bag itself.

There is therefore the need to modify the system of attachment/detachment of the bag to the frame of the bicycle, so as to improve the use of such bags during pedaling, as well as the need to have an easily removable system, so as to increase the possibilities of use of the bags themselves.

SUMMARY OF THE INVENTION

The technical task of the present invention is therefore that of improving the state of the art.

In the context of such technical task, one object of the present invention is to implement a modular bag for bicycles and the like having optimal strength characteristics, as well as the ability to facilitate its mounting and/or dismounting from the frame of the bicycle and the like.

Still another object of the present invention is to make a modular bag for bicycles and the like which is versatile from the standpoint of use by a cyclist.

Such task and such objects are all attained by the modular bag for bicycles and the like according to the present application.

The present application refers to preferred and advantageous embodiments of the invention.

BRIEF DESCRIPTION OF THE DRAWINGS

The characteristics of the invention will be better understood by every man skilled in the art from the following description and from the enclosed drawings tables, given as a non-limiting example, in which:

FIG. 1 is a side view of a bicycle provided with two lateral bags according to the present invention;

FIG. 2 is a front perspective view of a first component of the bag according to the present invention;

FIG. 3 is a front perspective view of a bag assembled according to the present invention;

FIG. 4 is a front perspective view in a first operative configuration of the bag according to the present invention;

FIG. 5A is a rear perspective view of a second component of a bag according to the present invention;

FIG. 5B is a further version of the second component pursuant to FIG. 5A;

FIG. 6 is a front perspective view of one version of a first component according to the present version, in a first operative position;

FIG. 7 is a front perspective view of the second component pursuant to FIG. 6;

FIGS. 8A, 8B, 8C illustrate rear perspective views of the three operative steps of the second component according to the present invention;

FIG. 9 is a front perspective view of one version of the bag according to the present invention;

FIG. 10 is a front perspective view of one version of the bag according to the present invention;

FIG. 11 is a rear perspective view of a second component of the bag according to one version of the present invention;

FIGS. 12 and 13 illustrate enlarged details of the second component pursuant to FIG. 11.

DETAILED DESCRIPTION OF THE INVENTION

With reference to the enclosed FIG. 1, reference number 1 overall indicates a bag for bicycles and similar vehicles according to the present invention, adapted to be constrained to the frame of the bicycle and/or to the rear rack and/or to the front rack and/or to the handlebar and/or to at least one bar of the frame of the bicycle.

In particular, in FIG. 1, a first bag 1 is illustrated, positioned laterally with respect to the bicycle, at a front wheel 2 of a bicycle and a second bag 1 is illustrated laterally positioned at a rear wheel 3 of a bicycle.

The bag 1 according to the present invention consists of a first component 4 and of a second component 5.

In such a manner, the present invention regards a modular bag 1, capable of being adapted to a great number of requirements and situations, according to the desires and tastes of the user. In addition, the bag 1 is modular also due to the fact that the first component 4 and the second component 5 could also be used separately, depending on the versions and on the requirements.

The bag 1 according to the present invention can be a lateral bag, i.e. positioned along a side of a bicycle or of a similar vehicle, or a front bag, e.g. when positioned at the handlebar of the bicycle or of the similar vehicle, or a rear bag, when positioned at the rear zone of the bicycle or of the similar vehicle.

In particular, the first component 4 comprises a support container, which is adapted to be constrained, possibly removably, to a frame of the bicycle or the like, in particular to the front rack and/or rear rack of the bicycle and/or to the handlebar and/or to at least one bar of the frame (e.g. to one of the substantially vertical connection bars for the front wheel 2 (e.g. the fork of the bicycle) and/or for the rear wheel 3).

The first component or support container 4 can have a substantially parallelepiped shape; it is provided with an opening 6 (e.g. an upper face thereof in the parallelepiped configuration) adapted to allow the housing of the second component 5. In one version of the invention, the opening 6 is adapted to allow the housing in the first container or support container 4 of the objects to be transported, also in the absence of the second component 5.

In an alternative version, the first component 4 can have a substantially cylindrical shape, with its upper base including the opening 6, or it can have a substantially semispherical or semi-ellipsoid shape.

In each case, for the first component or support container 4 it is possible to identify at least one front surface or face 7, adapted during use to be directed outward with respect to the frame of the bicycle, e.g. substantially parallel to a greater extension of the front wheel 2 and/or of the rear wheel 3, a rear surface or face 8, adapted during use to come into contact and/or be constrained with the frame of the bicycle, at least one lateral surface or face 9 and a lower base 10. In particular, there can be two lateral faces or surfaces 9.

The lower base 10 is opposite the opening 6.

In at least one version of the invention, the rear and front faces or surfaces 7, 8 and/or the lateral faces or surfaces 9 are substantially parallel to each other.

In addition, the lateral openings or faces 9 are substantially perpendicular to the front 7 and rear 8 surfaces or faces.

The dimensions respectively of the rear and front faces or surfaces 7, 8 and/or of the lateral faces or surfaces 9 can be the same or they can be different from each other.

The various surfaces or faces 7, 8, 9, and the lower base 10 are made in a manner such to be joined together so as to determine a single internal space—which is accessed from the opening 6, so as to at least partially house the second component 5 and/or the objects to be transported.

The first component or support container 4 can be made of a single piece or for example of at least two pieces.

In the latter version, the first component or support container 4 has the front face or surface 7, the rear face or surface 8, the lateral faces or surfaces 9 all substantially having the same height H (with respect to the lower base 10).

In such a manner, their edges of respective ends 7*a*, 8*a*, 9*a* form a single and/or upper perimeter 11 lying on a plane substantially parallel to the ground.

All this forms the first portion of the first component or support container 4.

From such perimeter 11, the second portion 14 of the first component or support container 4 departs, possibly in a removable manner; the second portion 14 is positioned above the first portion of the first component or support container 4. Analogous to that indicated above, the second portion 14 comprises a substantially parallelepiped shape and/or a substantially cylindrical or tubular shape.

In particular, the second portion 14 has on the lower part an opening which coincides with the opening determined by the perimeter 11, on the upper part the opening 6, and a front wall 17, a rear wall 18 and at least one lateral wall 19 can be identified therein.

The edges of lower ends 17*a*, 18*a*, 19*a* respectively of the walls 17, 18, 19 coincide (which form a lower peripheral edge 16 of the second portion 14) and/or are adapted to come into contact respectively with the edges of upper ends 7*a*, 8*a*, 9*a* and/or with the perimeter 11.

In order to constrain the first portion and the second portion 14 of the first component or support container 4 to each other, in a removable but secure manner, coupling means 12 can be present, for example in the form of clips or elastic bands or clasps by pressure, or by fitting, or by interference, etcetera.

At least one accessory can be further applied to such coupling means 12, such as a bottle holder (illustrated in FIG. 3), a reflective means (illustrated in FIGS. 6, 7), a light, etcetera.

The fixing of the at least one accessory can be determined by the presence of a suitable slit in the latter and of a corresponding tongue present in the first component 4 (or vice versa) and/or one or the other present at the coupling means 12, or by means of similar coupling means.

The coupling means 12 can be positioned for example at the front wall 17 in order to be connected to the surface or face 7, and/or at the lateral wall 19, in order to be connected to the lateral face or surface 9, etcetera.

The walls 17, 18, 19 of the second portion 14 can all have the same height or they can have different height.

For example, in the version illustrated in FIGS. 2 and 3, the front wall 17 has a first height HI, the rear wall 18 has a second height H2 (with respect to the perimeter 11 and/or to the lower perimeter 16), in which H2 is greater than HI.

The lateral walls 19 have a height h progressing from HI to H2, since they act as connection between the front wall 17 and the rear wall 18.

At the highest zone, highest during use, of the rear wall 18 it is possible to provide for a handle 20, adapted to be gripped by a user in order to position and/or remove the first component or support container 4.

The handle 20, in one version of the invention, is attained by making a through transverse slit along the edge of upper end 18*a* of the rear wall 18 (such slit for example parallel to the ground). Such handle 20 and/or slit can be shaped in an ergonomic manner and/or padded with a suitable material, so as to improve the gripping comfort for the user.

The handle 20, if the rear wall 18 has the same height H2 with respect to the height HI of the front wall 17, can still be present and be positioned at least at an upper zone, upper during use, of the rear wall 18.

Alternatively, the handle 20 can be positioned at a zone that during use is an upper zone of the front wall 17 and/or of the lateral walls 19, alternatively or in combination with the possible handle 20 present in the rear wall 18.

If the first component 4 is made of a single piece, the handle 20 can be made at at least one of the edges of upper ends 7*a*, 8*a*, 9*a*.

Since the first portion and the second portion 14 of the first component 4 (in the version in which the latter is not made of a single piece) are constrained to each other by means of the coupling means 12, possible movements (mounting/dismounting) of the support container 4 occur as if it was actually made of only one piece.

In the version in which the first component 4 is made of only one piece, this can have a shape which sums together the characteristics previously described for the first portion and the second portion 14 thereof.

The material constituting the first component 4 can be a plastic material, carbon material, a fabric, e.g. knitted, a non-woven fabric, etcetera. The material is also possibly light, strong and/or durable. Such material must be rigid. i.e. adapted to give structure to the first component 4 so as to support the weight of the objects to be transported. In addition, such material is preferably impermeable to water and/or easily cleanable, so as to eliminate the dirt that can be accumulated on the same while pedaling and/or comprising a treatment adapted to render it water repellent, stain resistant, abrasion resistant, etcetera.

The first component or support container 4 can have, in at least one zone thereof, at least one slit 21. Such at least one slit 21 usually has a longitudinal progression that is substantially horizontal or parallel to the ground.

Such at least one slit 21 has a length usually comprised between 2 and 4 cm.

Such at least one slit 21 is adapted to constrain other components or components in addition to the support container 4. e.g. by means of small bands, buckles, or similar fixing means.

In some positions or depending on a specific version, such at least one slit 21 is actually two slits, in which the two slits 21 are positioned one on top of the other, spaced by a space of about 0.5-2 cm. Thus, it is possible to constrain a small band, a buckle or similar means to such two slits 21 in an even more secure manner.

In a further version, the first component or support container 4 can have a cover 22. Such at least one cover 22 is during use adapted to close the opening 6 of the support container 4, for example according to particular use conditions or depending on the requirements of the user.

Such cover 22 has a shape substantially corresponding to that of the opening 6, possibly provided with a lateral edge 22a in order to better close the support container 4.

Such cover 22 can be fixed to the rear wall 18 of the second portion 14 (at a certain distance from the possible handle 20) if present or to the rear face or surface 8 of the support container 4, by means of bands or buckles or by means of suitable hinge means 22b, possibly removable.

The first component or support container 4 is fixed to the frame of the bicycle, such as for example the rear rack and/or front rack and/or to a bar of the frame, by means of connection means 25.

The connection means 25, for example in the versions illustrated in FIGS. 8A-8C, are connection means lacking mechanical adjustment means.

The connection means 25 are generally placed at the upper zone, upper during use, of said rear surface or face 8 and/or of the rear wall 18 of the first component or support container 4.

In the version illustrated in the indicated figures, there are two connection means 25, in right and left lateral positions during use, and they each comprise a band 25a which is inserted within two slits 21 so as to project, with both ends 26, 27 thereof, to the rear of the support container 4, towards the frame of the bicycle.

There may also be only one connection means 25, possibly positioned in central position of the first component 4, so as to support the latter in a balanced manner, and securely constrain it to the frame of the bicycle. Additionally, there can also be more than two connection means 25.

The ends 26, 27 of the band 25a can have strap and/or hook and loop closure elements, such as those known with the commercial name Velcro. Alternatively, the ends 26, 27 of the band 25a can have adhesive means for the connection of a first end 26 at the second end 27.

In addition, it is possible that a first end 26 of the band 25a can have an annular buckle, possibly flattened so as to take on a substantially rectangular or oval shape, with length equal to about the width of the band 25a.

In such buckle, it is possible to pass the second end 27 of the band 25a such that the latter encloses a bar of the rack and/or of the handlebar and/or of the frame of the bicycle.

Such second end 27 can then be folded on itself (and pulled so as to tightly enclose the bar of the frame of the bicycle) in order to then be connected to the rear wall 18 and/or to the rear surface or face 8 of the support container 4, in an area 28 covered by an adhesive element or by one of the two strap and/or hook and loop connection systems, such as those known with the commercial name Velcro, in particular the other with respect to that present at the end 27 of the band 25a.

In each case, the connection means 25 are of removable type since the support container 4 can be constrained to or released from the frame of the bicycle.

The present invention hence also refers to a method for removably connecting a bag for bicycles and similar vehicles according to the present invention, adapted during use to be removably constrained to the frame of the bicycle and/or to the rear rack and/or to the front rack and/or to the handlebar and/or to at least one bar of the frame of the bicycle, comprising the steps of providing a first component 4, in which the first component 4 comprises a support container provided with an opening 6 and at least one removable connection means 25 comprising at least one band 25a provided with at least one strap and/or hook and loop closure element, connecting the at least one connection means 25 to the first component 4, removably constraining, during use, the first component 4 to the frame of the bicycle and/or to the rear rack and/or to the front rack and/or to the handlebar and/or to at least one bar of the frame of the bicycle by means of the at least one connection means 25.

The method then provides for a step of supplying at least the band 25a provided with a first end 26 and with a second end 27, in which the first end 26 is provided with an annular buckle, possibly flattened so as to take on a substantially rectangular or oval shape, with length equal to about the width of the band 25a, passing the second end 27 within at least one slit 21 present in the first container 4, optionally in two slits 21, in a manner such that both the first end 26 and the second end 27 are directed towards the bicycle or similar vehicle, passing the second end 27 of the at least one band 25a around at least one bar of the frame of the bicycle and/or of the rear rack and/or of the front rack and/or of the handlebar so as to enclose the at least one bar, passing the second end 27 within the buckle present in the first end 26 and tightening such that the at least one band 25a is tightened around the at least one bar, folding the second end 27 on itself such that the at least one strap and/or hook and loop closure element is removably connected to the rear wall 18 and/or rear surface or face 8 of the support container 4, in an area 28 covered by an adhesive element or by a means corresponding to the at least one strap and/or hook and loop closure element, with respect to that present at the second end 27.

The method according to the invention also comprises the steps of providing a second component 5 and of at least partially housing the second component 5 in the first component or support container 4 by means of an opening 6 present therein.

If the support container 4 has, according to one version of the invention, a size such to come into contact with the zone relative to the hub of the wheel 2, 3 of the bicycle, it is possible that connection means 25 be provided for also in this zone. Alternatively, at the zone of the hub of the wheel 2, 3, different connection means can be provided for, depending on the requirements.

The strap and/or hook and loop connection means 25 are very simple but simultaneously strong and therefore better than a mechanical attachment, since they are also light, hard to damage and easier to repair in case of problems or damage that could occur.

As stated above, the bag 1 according to the present invention also consists of a second component 5, for example illustrated in several possible versions thereof in FIGS. 9 to 13.

The second component 5 is in the form of a sack, backpack or bag, preferably made of water-resistant and dirt-resistant material, which during use can be removably housed within the first component or support container 4 so as to be transported during pedaling.

Such second component 5 can in some manner also be constrained, in a removable manner, to the support container 4, for example as a visible in FIG. 3, in which an elastic cord or band 30 is present which is fixed e.g. by means of buckles, and/or bands and/or the slits 21 to the support container 4. Also in FIGS. 4, 5 A and 5B, the second component 5 is visible which is extracted from the first component 4, e.g. when the user has reached his/her destination, and hence wishes to remove the second component 5 and bring it with him/her, for example to the campsite, or when he/she must remove the second component 5 from the first component 4.

In such case, the elastic cord or band 30, first used for fixing in position the second component 5 with the first component 4, can be made to pass into suitable loops or the like present in the back or in the rear part of the second component 5, so as to transform the elastic cord or band 30 into one or two bands that can be worn around the shoulders of the user, in the classic backpack or bag manner.

Illustrated in more detail in FIGS. 11-13 is such fixing of the elastic cord or band 30 in the rear part of the second component 5, and such loops—at whose interior the elastic band 30 is made to pass—can be shaped as illustrated in FIG. 12. For example, such loops or the like can be constituted by a plate 31 which is fixed to the fabric or to the material of the second component 5 and provided with a bridge like protrusion 32 which determines a through opening 33 between plate 31 and bridge-like protrusion 32. Such through opening 33 allows fixing a buckle 34 to the bridge-like protrusion 32, which is in turn fixed to the elastic cord or band 30 by means of modes of known type.

Alternatively or additionally, the second component 5, once extracted from the first component 4 in order to be transported by the user, can be inserted in an external casing 36, illustrated in FIGS. 9 and 10. The external casing can be provided with backs or shoulder straps, possibly padded, as in a conventional backpack, or other expedients useful for the user depending on the specific needs.

According to further versions of the invention, as stated above, the first component 4 can be used by the user even without the second component 5 and vice versa the second component 5 can also be used as a bag or backpack, independent of the first container 4, for example in association with the external casing 36.

Both the first component 4 and the second component 5 are in fact adapted to contain objects and/or loads, which the user intends to transport.

In addition, since many cyclists use the same bicycle both for journeys and for moving for example within a city, it is possible to not remove the bag 1 even when the user is stopped. The first container 4 can act as a small basket, also for daily use of the bicycle, increasing the travel comfort of the user even for brief city transfers. It follows that the bag 1, along with its first component 4 and second component 5, determines a modular system. In particular, the first component 4 can be used in combination or not in combination with the second component 5 and the latter can also be used on its own or in combination with the external casing 36 and/or with other containers with different function.

Therefore, the present invention also regards a kit comprising a bag 1 according to the present invention, comprising a first component 4, a second component 5 and an external casing 36, in which the second component 5 is adapted to be at least partially housed in the first component 4 or in the external casing 36 when the second component 5 is extracted from the first component 4, such that it can be transported by the user.

It has therefore been seen that the bag 1 according to the present invention is modular, durable over time and adapted to any use condition.

Finally, the present invention also relates to a bicycle or similar vehicle comprising at least one bag 1 according to the preceding description.

The present invention has been described according to preferred embodiments, but equivalent variants can also be conceived without departing from the scope offered by the following claims.

The invention claimed is:

1. A bag for a bicycle removably constrained to a rear rack of the bicycle, wherein said bag comprises a first component, wherein said first component comprises a support container provided with an internal space and an opening, wherein said internal space is accessed by said opening, wherein said first component has at least one removable connection means comprising at least one band provided with at least one strap or hook and loop closure element, for removably constraining during use said first component to the rear rack, wherein said bag comprises a second component at least partially housed, in a removable manner, in said first component through said opening, wherein said first component comprises at least one first portion formed by front, rear and lateral surfaces, each of said front, rear and lateral surfaces having respective heights, and a second portion comprised of front, rear and lateral walls, each of said front, rear and lateral walls having respective heights, said second portion being placed above said first portion, wherein said opening delimits an upper perimeter of said second portion, and wherein said at least one first portion and said second portion are comprised of a rigid material which maintains its structure and maintains the respective heights of said at least one first portion and said second portion.

2. The bag according to claim 1, wherein said first component has a shape which is parallelepiped or cylindrical or semi-spherical or semi-ellipsoid.

3. The bag according to claim 2, wherein said second component is in the form of a sack, backpack or bag, or wherein said second component is removably constrained to said support container, by means of an elastic cord or band which is fixed by means of buckles, or bands and/or by means of said slits to said support container.

4. The bag according to claim 1, wherein said first component is composed of at least one frontal surface, adapted during use to be directed towards the exterior with respect to the frame of the bicycle, wherein said frontal surface is parallel to a greater extension of a front or rear wheel of the bicycle, a rear surface, adapted during use to come into contact with or to be constrained with the frame of the bicycle and parallel to said frontal surface, at least one lateral surface and a lower base, wherein said lower base is opposite said opening.

5. The bag according to claim 4, wherein said frontal and rear surfaces or said lateral surfaces have a same height (H), or wherein said front surface, said rear surface, said lateral surface respectively have an end edge which forms a single or upper perimeter, such perimeter lying on a plane parallel to the ground.

6. The bag according to claim 5, wherein said second portion comprises a frontal wall provided with a lower end edge, a rear wall provided with a lower end edge and at least one lateral wall provided with a lower end edge, as well as a lower opening delimited by a lower peripheral edge formed by said lower end edges, wherein said lower peripheral edge is adapted to come into contact with said perimeter of said first portion of the first component, wherein said second portion is constrained, in a removable manner, to said first portion by means of coupling means, comprising at least one of elastic bands, clips, hooks by pressure, or by fitting or by interference.

7. The bag according to claim 6, comprising at least one accessory, including at least one of a water bottle holder, a reflecting means and a light, wherein said at least one accessory is coupled to said coupling means or wherein said coupling means comprise a slit in one of said accessory and said first component or at said coupling means and a corresponding tab present in the other from between said accessory and said first component or at said coupling means, or wherein said coupling means are positioned at said frontal wall in order to be coupled to said surface or face, or at said lateral wall to be coupled to said lateral surface or face, or at said rear wall to be coupled to said rear surface or face.

8. The bag according to claim 6, wherein said frontal wall has a first height (HI), said rear wall has a second height (H2) with respect to said lower peripheral edge, wherein (H2) is greater than (HI), and said lateral walls have a height (h) progressing from (HI) to (H2), since they act as a connection between frontal wall and rear wall, wherein at an upper zone of said rear wall or at an upper end edge of said rear wall, a handle is present that is adapted to be gripped by a user in order to position or remove said first component or support container.

9. The bag according to claim 8, wherein said handle comprises a transverse through slit parallel to the ground, or is shaped in an ergonomic manner to be gripped by a human hand or padded with a suitable material, so as to improve the gripping comfort by the user.

10. The bag according to claim 1, wherein said second portion has a shape parallelepiped cylindrical or tubular.

11. The bag according to claim 1, wherein said first component comprises at least one slit with a longitudinal progression that is horizontal or parallel to the ground, or comprises at least one slit with a length comprising 2 cm and 4 cm and/or adapted to constrain further components to said first component or support container, by fixing means including clips, buckles, or wherein two slits are present, one positioned on top of the other, spaced by a space of 0.5 cm-2 cm.

12. The bag according to claim 1, wherein said at least one connection means is placed at an upper zone of said rear surface or face or of said rear wall of said first component or support container, in right or left lateral position during use or central, and/or wherein said at least one band is inserted within one or two slits to project, with both ends thereof, behind said support container, towards the frame of the bicycle, to constrain said support container to the bicycle, or wherein said at least one band comprises two ends which have said at least one strap or hook and loop closure element, or adhesive means for connecting a first end at the second end, or wherein said at least one band comprises a first end provided with an annular buckle, flattened to take on a rectangular or oval shape, with length equal to the width of said band, wherein said buckle is adapted to allow the passage of a second end of said at least one band, so that the latter encloses a bar of the rack or of the frame of the bicycle.

13. The bag according to claim 1, wherein said first component is made of at least one of a plastic material, carbon, a fabric, or of a rigid material or resistant material or durable material or waterproof material, or cleanable material, or comprising a treatment to render it at least one of water repellent, stain resistant, abrasion resistant.

14. The bag according to claim 1, wherein said first component comprises a cover adapted during use to close said opening, wherein said cover has a shape corresponding to that of said opening, provided with a lateral edge in order to improve the closure of said support container, or wherein said cover is fixed to said rear wall of said second portion or to said rear surface or face of said support container by means of bands or buckles or by means of hinge means.

15. A method for removably connecting a bag for a bicycle according to claim 1, which is removably constrained to the rear rack, comprising the following steps:
providing a first component, wherein said first component comprises a support container provided with an opening and at least one removable connection means comprising at least one band provided with at least one strap and/or hook and loop closure element,
connecting said at least one connection means to said first component,
removably constraining during use said first component to the rear rack by means of said at least one connection means.

16. The method according to claim 15, wherein said step of providing at least one connection means comprises providing said at least one band provided with a first end and with a second end, wherein said first end is provided with an annular buckle, flattened so as to take on a rectangular or oval shape, with length equal to a width of said band, passing said second end within at least one slit present in said first container, optional within two slits, in a manner such that both said first end and said second end are directed towards said bicycle,
passing said second end of said at least one band around the rear rack to enclose said rear rack,
passing said second end within said buckle present in said first end and tightening such that said at least one band is tightened around said at least one bar,
folding said second end on itself such that said at least one strap or hook and loop closure element is removably connected to said rear wall and/or rear surface or face of said support container, in an area covered by an adhesive element or by a means corresponding to said at least one strap or hook and loop closure element, with respect to that present at said second end.

17. The method according to claim 15, comprising the steps of providing a second component and of at least partially housing said second component in said first component or support container by means of an opening present in the same.

18. A bicycle, comprising at least one bag according to claim 1.

19. A kit comprising the bag according to claim 1, comprising a first component, a second component and an external casing, wherein said second component is adapted to be at least partially housed in said first component or in said external casing, to be able to be transported by the user.

20. A bag for a bicycle removably constrained to a rear rack of the bicycle, wherein said bag comprises a first component, wherein said first component comprises a support container provided with an internal space and an opening, wherein said internal space is accessed by said opening, wherein said first component has at least one removable connection means comprising at least one band provided with at least one strap or hook and loop closure element, for removably constraining during use said first component to the rear rack, wherein said bag comprises a second component at least partially housed, in a removable manner, in said first component through said opening, wherein said first component comprises at least one first portion formed by front, rear and lateral surfaces, each of said front, rear and lateral surfaces having respective heights, and a second portion comprised of front, rear and lateral walls, each of said front, rear and lateral walls having respective heights, said second portion being placed above said first portion, wherein said opening delimits an upper perimeter of said second portion, and wherein said at least one first portion and said second portion are comprised of a rigid material which maintains its structure and maintains the respective heights of said at least one first portion and said second portion, wherein said front surface of said first component is composed of a frontal surface adapted during use to be directed towards the exterior with respect to the frame of the bicycle, wherein said frontal surface is parallel to a greater extension of a front or rear wheel of the bicycle, wherein said first component further comprises a rear surface, adapted during use to come into contact with or to be constrained with the frame of the bicycle and parallel to said frontal surface, and wherein said first component further comprises at least one lateral surface and a lower base, wherein said lower base is opposite said opening, wherein said frontal and rear surfaces and said lateral surfaces have a same height (H), or wherein said front surface, said rear surface and said lateral surface respectively, each have an end edge which forms a single or upper perimeter, such perimeter lying on a plane parallel to the ground, wherein said front wall of said second portion comprises a frontal wall provided with a lower end edge, and wherein the rear wall comprises a lower end edge and said lateral walls comprise a lower end edge, wherein said second portion further comprises a lower opening delimited by a lower peripheral edge formed by said lower end edges, wherein said lower peripheral edge is adapted to come into contact with said perimeter of said first portion of the first component, wherein said second portion is constrained, in a removable manner, to said first portion by means of coupling means, comprising at least one of elastic bands, clips, hooks by pressure, or by fitting or by interference, and wherein said frontal wall of said second portion has a first height (HI), and said rear wall of said second portion has a second height (H2) with respect to said lower peripheral edge, wherein (H2) is greater than (HI), and said lateral walls of said second portion have a height (h) progressing from (HI) to (H2), and act as a connection between frontal wall and rear wall, and further comprising a handle at an upper zone of said rear wall, said handle for being gripped by a user to position or remove said first component or support container.

\* \* \* \* \*